Patented Mar. 22, 1927.

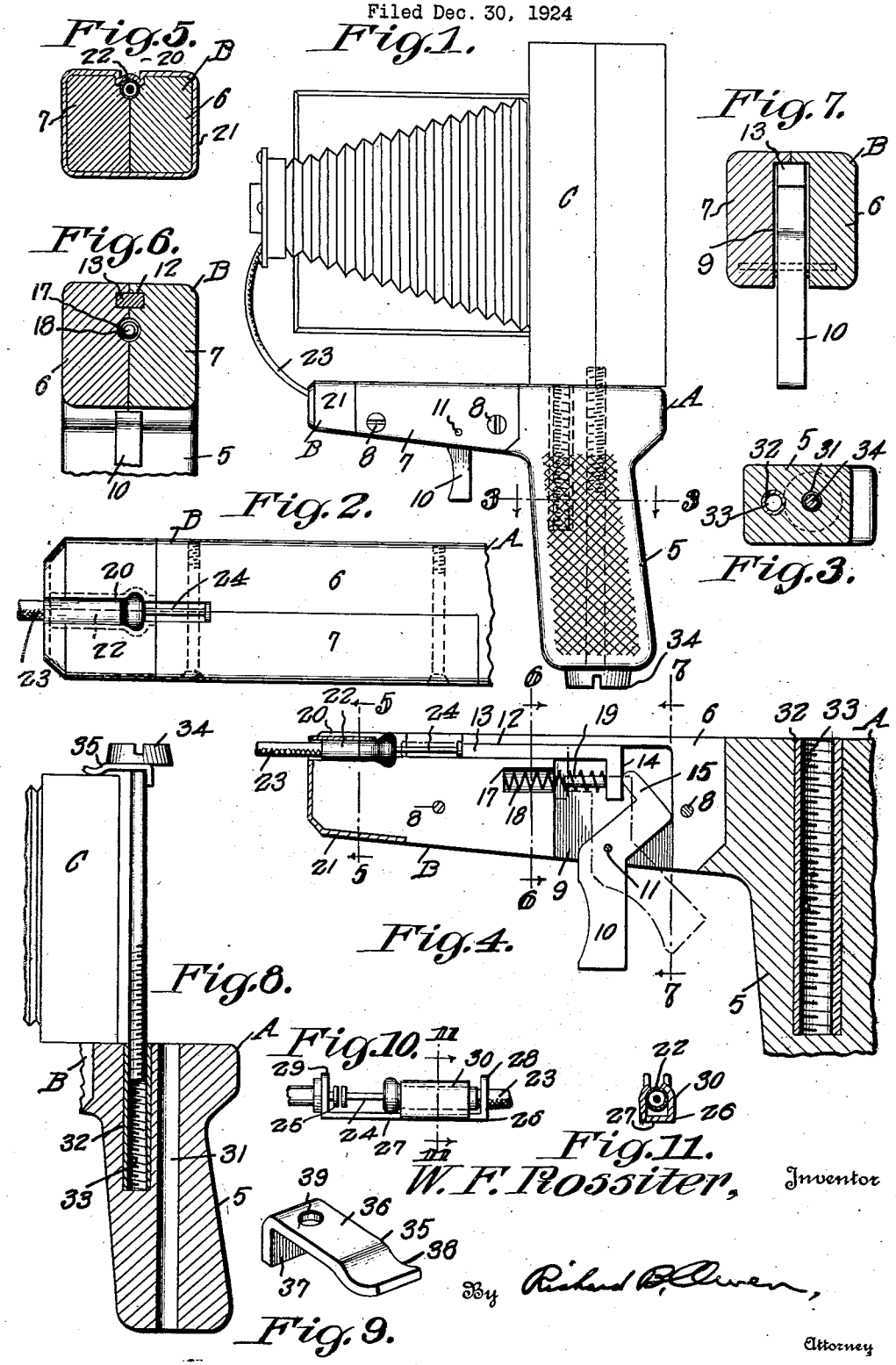

1,621,903

UNITED STATES PATENT OFFICE.

WAYNE F. ROSSITER, OF VALLEJO, CALIFORNIA.

PISTOL GRIP FOR CAMERAS.

Application filed December 30, 1924. Serial No. 758,884.

The present invention appertains to a device for supporting a camera and has for its prime object to provide such a device which can be grasped in one hand so that the camera may be properly alined with the object to be photographed very easily and quickly, the device being particularly designed for taking snapshots.

Another very important object of the invention is to provide a support of this nature having means incorporated therein for operating the shutter mechanism of the camera.

A still further object of the invention is to provide a device of this nature for effectively holding the camera thereon.

Another very important object of the invention is to provide a device of this nature having an exceedingly simple and efficient structure, one which is reliable in operation, inexpensive to manufacture, compact, light, strong, durable, and well adapted to the purpose for which it is designed.

With the above and numerous other objects in view as will appear as the description proceeds, the invention resides in certain novel features of construction, and in the combination and arrangement of parts as will be hereinafter more fully designed and claimed.

In the drawing:

Figure 1 is an elevation of the device embodying the features of my invention showing a camera supported thereon, Figure 2 is a top plan view of the device, said view being slightly enlarged with the handle portion broken off, Figure 3 is a transverse section through the handle looking downwardly on line 3—3 of Figure 1, Figure 4 is a longitudinal vertical section through the device showing a portion of the handle broken off, Figures 5, 6 and 7 are transverse sections taken through the body of the device substantially on the lines 5—5, 6—6, and 7—7 respectively of Figure 4 looking in the direction of the respective arrows, Figure 8 is a detail section taken vertically through the handle showing another manner of supporting a camera on the device, Figure 9 is a detail perspective view of the clamp plate used in Figure 8, Figure 10 is an elevation of a coupling device used at times with my device, and Figure 11 is a transverse section taken therethrough substantially on the line 11—11 of Figure 10.

Referring to the drawing in detail it will be seen that A designates the improved supporting device generally and C the camera thereon. My improved supporting device is formed to simulate in appearance and contour a pistol and includes the handle 5 and body B. This body B is formed in two sections 6 and 7 the former being integral with the handle and the latter held thereon by means of screws or the like 8. The manner of sectioning the body or the device has merely been disclosed herein by way of example and, of course, may be varied considerably without departing from the spirit or scope of the invention. In the embodiment of the invention which I have disclosed in the drawing the sections 6 and 7 of the body B are provided with trigger compartments 9 having the trigger lever 10 pivoted on a pin 11 intermediate its ends. The finger engaging portion of this trigger lever 10 depends below the body. A bore 12 is provided in the body for slidably receiving a plunger rod 13 the rear end of which is provided with an angular extension 14 movable in the compartment 9 and engageable by a nose extension 15 on the inner or upper end of the trigger lever 10. A recess 17 is provided in the body communicating with the forward end of the compartment 9. A coil spring 18 has one end normally disposed within this pocket 17 while its other end is normally disposed about a pin 19 projecting forwardly from the extension 14 of the plunger rod 13. When the trigger 10 is actuated to the dotted line position shown in Figure 4 the plunger 13 is moved forwardly to the dotted line position shown in the same figure at which time it will be seen that the coil spring 18 will be compressed and the pin 19 located in the pocket 17 so that when the trigger lever is released said spring will return the plunger rod and the trigger back to their original positions as shown in full lines in Figure 4. At the forward end of the body a recess 20 is provided in alinement with the bore 12 and a band 21 is disposed about the forward end of the body and shaped to fit partly into the recess 20. This band 21 is shaped so as to hold the handle 22 of the shutter actuating cord 23 in the recess, which cord is common to a large number of conventional cameras now found on the market and includes the plunger operating wire 24 the end of which is placed in abutment with the end of the plunger rod 13. When the handle 22 is thus situated it will be seen that as the trigger lever 10 is actuated as previously described to move the plunger 13 that said plunger 13 will in turn actuate the plunger wire 24 so as to operate the shutter of the camera.

In some forms of cameras the shutter actuating cord 23 will not be long enough so that its handle 22 may be situated in the recess 20 and I therefore utilize an independent actuating cord of the same type situating its handle in the recess and terminating its wire 25 in a coupling device indicated generally at 26 in Figure 10. This coupling device consists of a plate 27 having upstanding end apertured ears 28 and 29 and along its longitudinal edges with upstanding clamp jaws 30 which hold the handle 22 of the camera in place, the cord 23 passing through the apertured ear 28. The wire 25 passes through the other apertured ear 29 and abuts or is situated in close proximity to the terminal of the wire 24 so as to actuate this wire 24 and operate the shutter in a manner which will be quite clear to those familiar with this form of shutter operating mechanism.

Particular attention is now called to the construction of the handle 5 which is provided with a longitudinally extending bore 31 of the same length as the handle and another longitudinally extending bore 32 beginning at the top of the handle and terminating intermediate its ends. In the bore 32, if desired, an internally threaded sleeve 33 may be provided or the bore itself may be provided with internal threads depending, of course, on the material from which the handle is manufactured or the manner in which it is manufactured. In Figure 1 it will be seen that a bolt 34 is disposed in the bore 31 with the head at the bottom of the handle and the threaded shank extending above the handle so as to be engaged by that portion of the camera which is usually engaged by the tripod support which is furnished with a large number of cameras but can be purchased for the use of a large number of cameras. There are, however, a large number of cameras having no such engaging means and in such the cameras may be supported as is shown in Figure 8 whereby the bolt 34 is engaged in the threaded sleeve 33 of bore 32 with its head extending a considerable distance above the upper portion of the device and bearing against a clamp plate 35 which in turn engages the upper portion of the camera to hold it firmly rested upon the body of the device. This clamping plate 35 preferably includes a body 36 having the angular extension 37 depending from one end and the curved engaging lip 38 extending from the other end. The body is provided with an opening 39 adjacent the angular extension 37 for the reception of the shank of the bolt 34. By screwing the bolt 34 into the sleeve 33 it will be seen that the camera may be very firmly held on to the device.

It is thought that the use and operation of the invention will be clearly understood without a more detail description. It will be apparent from the foregoing that I have devised a novel construction of camera holder, which will be cheaply manufactured and will be durable and effective under all conditions, and which is not liable to readily get out of order. The device embodies the features of advantage enumerated as desirable in the statement of the invention and the above description, and while I have in the present instance shown and described a preferred embodiment of it which will give in practice satisfactory and reliable results, it is to be understood that the same is susceptible of modification in various particulars without departing from the spirit or scope of the invention as hereinafter claimed or sacrificing any of its advantages.

Having thus described my invention, what I claim as new is:

1. A device of the class described including a body, a trigger lever pivoted in the body, a plunger slidable in the body and operable by the trigger lever, a spring in the body holding the plunger rod in a retracted position, said body provided with a recess registering with the plunger rod for supporting the handle of a shutter actuating means for a camera so as to be operable by the plunger when moved by the trigger lever, and a spring for normally holding the plunger in an inactive position.

2. A device of the class described including a body and a handle, said body provided with a trigger compartment, a bore extending forwardly from the trigger compartment, a plunger in the bore, a trigger in the compartment for actuating the plunger, a spring for holding the plunger normally in an inactive position, said body provided with a recess communicating with the forward end of the bore for receiving the handle of a shutter actuating member of the camera.

3. A device of the class described including a body and a handle, said body provided with a compartment, a bore leading forwardly from the compartment, and a recess communicating with the forward end of the bore, a trigger lever pivoted in the compartment, a plunger slidable in the bore and provided with an angular extension engageable by the trigger lever, a pin extending from the angular extension, a pocket for the reception of the pin, a coil spring having one end situated in the pocket and the other end about the pin to normally hold the plunger in a retracted or inactive position, said recess adapted to hold the handle of a shutter operating means for a camera in order to be actuated by the plunger when extended forwardly into the recess by operation of the trigger lever.

4. A device of the class described including a body and a handle, said handle including a bore extending longitudinally through its entire length and a second bore extending from its upper end to an intermediate portion and internally threaded, a bolt for association with the two bores, and means in the body for actuating the shutter operating means of a camera.

In testimony whereof I affix my signature.

WAYNE F. ROSSITER.